United States Patent Office 3,651,162
Patented Mar. 21, 1972

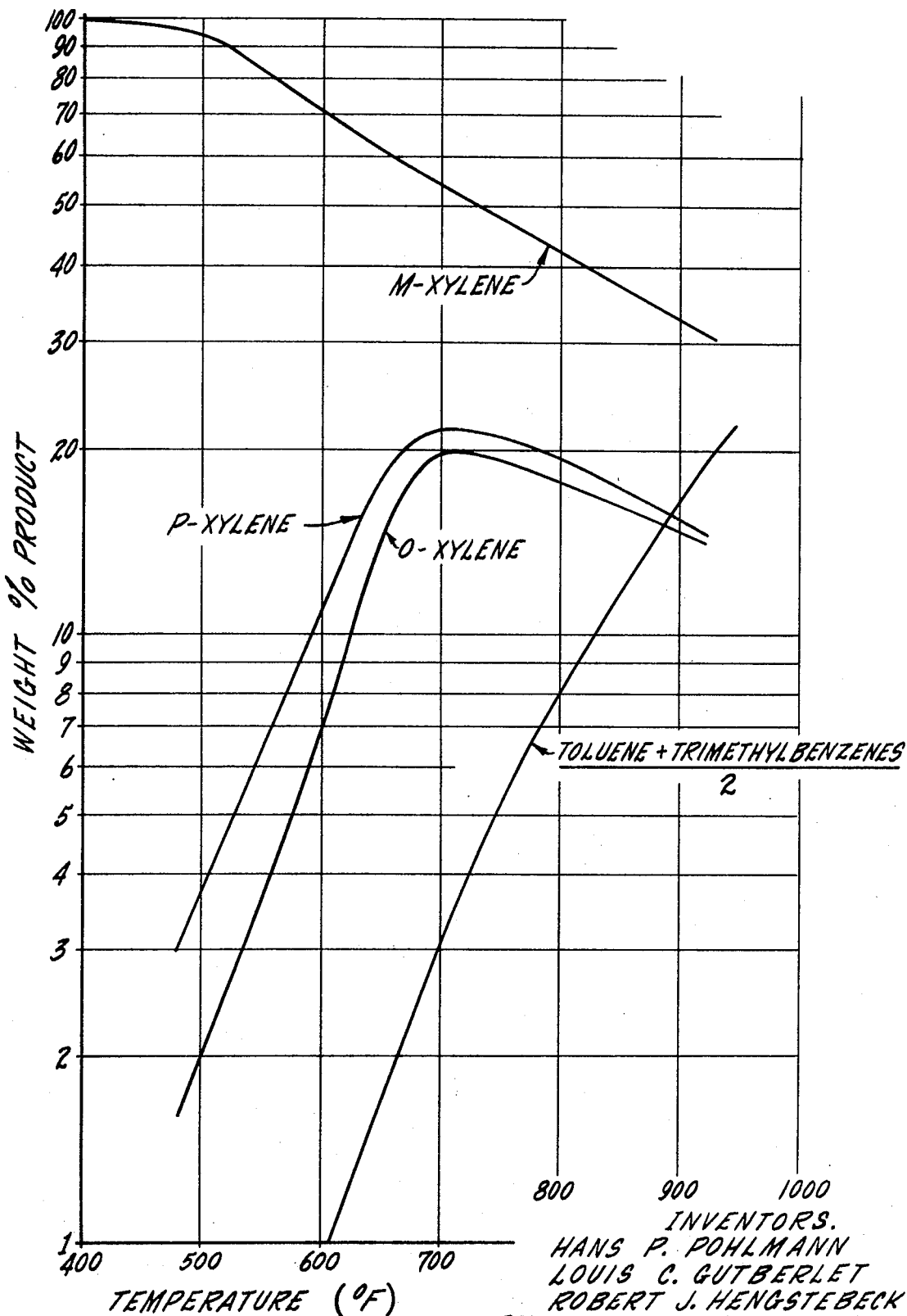

3,651,162
ISOMERIZATION AND DISPROPORTIONATION
OF ALKYL AROMATICS
Hans P. Pohlmann, Highland, Louis C. Gutberlet, Crown Point, and Robert J. Hengstebeck, Valparaiso, Ind., assignors to Standard Oil Company, Chicago, Ill.
Filed Feb. 27, 1969, Ser. No. 803,028
Int. Cl. B01j 11/40, 11/78; C07c 15/00
U.S. Cl. 260—672 T  7 Claims

ABSTRACT OF THE DISCLOSURE

Alkyl aromatic hydrocarbons are isomerized and disproportionated by contacting them at elevated temperatures in the presence of hydrogen gas with a catalyst comprising a silica-alumina cracking base impregnated with a hydrogenation component, a second metal from Group V-A of the periodic table, and a halogen. The preferred hydrogenation component is nickel, the preferred Group V-A metal is arsenic, and the preferred halogen is fluorine.

---

The present invention relates to an improved method for the isomerization and disproportionation of alkyl aromatic hydrocarbons, and more particularly to the isomerization and disproportionation of such compounds in the presence of a hydrocracking catalyst.

Benzene and certain alkyl benzenes, particularly the dimethyl and polymethyl benzenes, are very important and useful to the chemical industry. Toluene, on the other hand, is relatively less useful. Of the xylenes, para-xylene is one of the most useful, particularly as a starting material in the production of many polyester fibers. Thus, it is often desired to disproportionate alkyl aromatic hydrocarbons to obtain a maximum of dimethyl and polymethyl benzenes and a minimum of toluene and alkyl benzenes having alkyl groups higher than methyl. Of the xylenes, it is ordinarily desired to isomerize abundant metaxylene to the ortho form and, even more preferably, the para form, which are more difficult to produce.

It has now been found that alkyl aromatic hydrocarbons may be efficiently isomerized and disproportionated by contacting them at elevated temperatures in the presence of hydrogen gas with a catalyst comprising a silica-alumina cracking base which has been impregnated with a hydrogenation component, a second metallic component, and a halogen. The hydrogenation component is selected from the group consisting of cobalt, nickel, platinum, rhodium, and palladium. The second metallic component, often referred to as a "poison," is selected from the group consisting of arsenic, antimony, bismuth, and phosphorus. The hydrogenation component is present in an amount from about 0.1% to about 30% based on the total weight of the catalyst, and the second metallic component is present in an amount from about 0.1 to about 2 gram atoms per gram atom of the hydrogenation component. The halogen is present in the catalyst before contact with the hydrocarbons in an amount from about 0.5% to about 6.0%, based on the total weight of the catalyst. A catalyst which is suitable for use in carrying out the method of the present invention is described in U.S. Pat. No. 3,206,391, issued Sept. 14, 1965, and assigned to the assignee of this application.

More specifically, the isomerization and disproportionation reactions in accordance with the present invention are carried out in the presence of the aforementioned catalyst under suitable reaction conditions, generally under hydrogen pressures of 100–2000 p.s.i.g., 1000–20,000 standard cubic feet of hydrogen per barrel of feed, at a temperature of 500–1500° F. and a liquid hourly space velocity of 0.5–20.

The reaction conditions employed will depend upon the feed stock and the product mix that is desired. If it is desired to simply convert a mixture of alkyl aromatic hydrocarbons to a second mixture that is reduced in toluene content, the mixture is contacted with the catalyst under the aforementioned conditions, and the resulting isomerization and disproportionation will bring about the formation of a mixture which is enriched in dialkyl and polyalkyl benzenes, and is reduced in toluene content. This mixture may then be extracted, for example, to remove the xylenes, and the catalyst may then be employed to enrich the ortho and para isomers of the xylenes, reducing the meta-xylene content.

In carrying out the xylene isomerization reaction, the preferred temperature range is about 600–1000° F. Below this range, the reaction does not efficiently isomerize the meta isomer, and only relatively small amounts of ortho and para-xylene are produced. Above this range, the disproportionation to toluene and trimethylbenzenes becomes unacceptably high.

The catalyst employed in the present invention comprises a hydrogenation component, a solid acidic catalyst base component, and a second normally solid element of Group V-A of the periodic table, i.e., phosphorus, arsenic, antimony, and bismuth.

The acidic base comprises either naturally occurring or synthetic alumino-silicates, preferably containing about 5% to about 40% alumina by weight. The acidic component of the catalyst should be highly porous, having a surface area between about 100 and 800 square meters per gram. The preparation and properties of the catalyst base are well known in the art, and they need not be described further herein for the purpose of the present invention. It should be borne in mind that both naturally occurring and synthetic crystalline alumino-silicates, as well as amorphous alumino-silicates, may be employed as a catalyst base in accordance with the present invention. Included within this class are the acid treated clays and the so-called molecular sieves, particularly the large-pore molecular sieves having a pore diameter of about 8–9 angstroms, and the crystal structure of faujasite.

The hydrogenation component may comprise any of the well-known metallic hydrogenation catalysts, but is preferably selected from the metals of Group VIII of the periodic table, especially nickel, platinum, cobalt, and palladium. The hydrogenation component of the catalyst can advantageously be incorporated into the catalyst by impregnating a porous acidic base with a heat-decomposable compound of the hydrogenation component, followed by calcining to provide a composite. Typically, the catalyst base is impregnated with a solution of nickel acetate, chloroplatinic acid, or the like, and then dried. The drying is followed by pelleting and calcining at an elevated temperature of around 1000° F.

The finished catalyst may be also produced by other methods well known in the art such as co-gelling the various components and other well-known variations in catalyst preparation techniques.

The amount of hydrogenation component incorporated into the catalyst can vary over a wide range, with the amount being selected to provide the desired catalyst activity for the reaction contemplated. For example, large amounts of nickel, up to about 30% by weight, can be employed; and relatively small amounts of nickel, as little as 0.1% by weight, are also effective, with about 0.5 to 10% by weight nickel being preferred. Typically, about 0.1 to 2% platinum is effective in the catalyst, and preferably about 0.1 to 1% by weight platinum is employed.

The second metallic component may be incorporated into the catalyst during its manufacture by techniques well known in the art. For example, a nickel-silica-alumina composite of the type described above may be impregnated with a solution of an organic compound of the Group V–A elements, including aryl or alkyl substituted organometallics, such as triphenyl arsine, triphenyl stibine, etc., with the subsequent evaporation of the solvent to leave a deposit on the base. Also, the catalyst base can be impregnated with inorganic compounds including the acids, ammonium salts, nitrates, halides, etc., of the normally solid Group V–A elements, e.g., arsenic trioxide in an ammoniacal solution, followed by drying. Prior to use, the catalyst is treated with hydrogen at elevated temperatures. An organic compound of arsenic may also be introduced into the reaction zone with the feed, so that the base is impregnated with the Group V–A element in situ. Of the Group V–A elements, arsenic is preferred.

Normally, only a small amount of the Group V–A element is required in the catalyst. The total amount employed will most often be governed by the amount of hydrogenation component incorporated into the catalyst, and by the form of the Group V–A metal. For example, arsenic may be present as either the arsenide or subarsenide. Generally speaking, no more than one gram atom of the normally solid Group V–A element per gram atom of the hydrogenation component is required in the catalyst, although greater amounts may be employed as long as the desired catalytic activity is maintained. Specifically, arsenic is employed in a ratio of up to about 2 gram atoms per gram atom of hydrogenation component in the catalyst. Advantageously, however, about 0.01 to about 1.0 gram atoms of such elements per gram atom of hydrogenation component is employed, while a ratio of from about 0.1 to about 0.5 is preferred.

An exemplary catalyst, which produces outstanding results in accordance with the method of the present invention, consists essentially of a Group VIII hydrogenation component, especially nickel; a normally solid element of Group V–A, especially arsenic; fluorine; and a silica-alumina catalyst base. As previously mentioned, a wide range of silica-alumina bases are well known in the art. A particularly useful catalyst base in accordance with the present invention is so-called "high alumina" amorphous base containing about 20–30% Al$_2$O$_3$. A typical catalyst has about 0.5 to 5 weight percent nickel supported on the catalyst base, although up to about 10 weight percent nickel may be used in some instances. About 0.5–6 weight percent, and preferably about 2–4 weight percent, halide is incorporated into the catalyst by impregnating the catalyst base, either with or without the hydrogenation component, with an organic or inorganic halide compound which reacts therewith. Fluorine is the preferred halide since it has been found to impart an exceptionally high activity to the catalyst. The various components may be combined with the catalyst base either simultaneously or in a step-wise manner, followed by drying and calcining. In the latter case, exceptionally good results have been obtained by impregnating silica-alumina containing nickel with an inorganic fluoride solution, such as ammonium fluoride. However, the catalyst base may be impregnated with a single solution containing a nickel compound, an arsenic compound, and the halide. Compounds containing more than one of the components, for example, nickel fluoride, may also be used advantageously.

In the preparation of the above-described catalyst, exceptionally high activity has been produced when the catalyst is pre-reduced in a hydrogen atmosphere at 700–900° F., calcined at 900–1100° F., and then reduced again in hydrogen at 700–900° F.

Various halogen compounds may be used in preparing the preferred catalyst. These include inorganic compounds and alkyl or aryl organic compounds such as hydrogen fluoride, ammonium fluoride, fluorobenzene, benzyl trifluoride, benzyl fluoride, etc., although all are not necessarily equivalent in their effect upon the catalyst.

After the catalyst has become exhausted, it may be regenerated according to techniques which are well known in the art. A suitable regeneration procedure is set forth in aforementioned U.S. Pat. No. 3,206,391.

The following examples are intended to illustrate the present invention, and should not be construed as limitative, the scope of the invention being determined by the appended claims.

EXAMPLE I

A catalyst for use in the method of the present invention, was prepared utilizing an amorphous silica-alumina base having about 25% alumina by weight and 75% silica by weight. The base was impregnated with about 2% fluorine, 8% nickel, and 2.5% arsenic, based on the total weight of the catalyst. The catalyst was sized so that none of the particles would pass a 20 mesh screen, but all would pass a 14 mesh screen. This was a smaller size than would be used under normal commercial conditions, wherein a pelleted catalyst would be employed. However, this smaller size was more suitable for an experimental run.

The catalyst used in this instance had previously been used for 20 days to hydrocrack light catalytic cycle oil at a temperature of about 560° F. and a pressure of 1200 p.s.i.g. in the second stage of a conventional 2-stage hydrocracking apparatus.

The reaction employed consisted of stainless steel tubing having an inside diameter of 0.62 inch. The reactor is partially immersed in a lead bath. The hydrogen supplied to the reactor was purified by reaction over palladium catalyst at 400° F., which converts any oxygen present to water. The hydrogen is then dried over a suitable desiccant. Hydrogen flow was metered photoelectrically through a bubble flow meter containing water, after which the gas was again dried. The hydrogen was mixed with the reactant prior to entering the reactor.

A stream of meta-xylene was passed over the catalyst at 1 LHSV under a hydrogen pressure of 300 p.s.i.g. and a flow rate of 8000 standard cubic feet of hydrogen per barrel of feed. The temperature was maintained at 925° F. The product was collected for about three days. This run was repeated several times at constant reaction conditions, but at different temperatures. The results are shown in Table I below:

TABLE I

| Component | Weight percent | | | | |
|---|---|---|---|---|---|
| | 480° F. | 540° F. | 650° F. | 750° F. | 925° F. |
| Toluene | 0.2 | 0.5 | 1.7 | 5.2 | 19.3 |
| p-Xylene | 3.0 | 5.7 | 18.2 | 20.8 | 14.0 |
| m-Xylene | 95.0 | 89.9 | 60.2 | 47.2 | 30.2 |
| o-Xylene | 1.6 | 3.2 | 14.2 | 19.1 | 13.9 |
| Trimethyl benzenes | 0.2 | 0.6 | 3.0 | 6.8 | 19.2 |

A semi-logarithmic plot was made of the data shown in Table I. Also, the ratio of meta-xylene to para-xylene was computed and plotted. The results are shown in the drawing. As can be seen from an examination of Table I and the drawing, optimum production of non-meta-xylene isomers is achieved in the range of about 600–900° F., the optimum temperature being about 700° F. Below this range, there is relatively little conversion of meta-xylene to the other isomers. While conversion of meta-xylene to other isomers continues at a temperature above about 900° F., the disproportionation of meta-xylene to toluene and trimethylbenzenes becomes unacceptably high. As the darwing also demonstrates, the control of reaction conditions has an important influence on the product mix. For example, if it were desired to convert a meta-xylene to trimethylbenzenes and to toluene, it would be appropriate to use higher temperatures, going above the range ndicated.

EXAMPLE 2

A mixture of 80 volume percent toluene, 10 volume percent n-heptane, and 10 volume percent n-octane was delivered to the reactor described in Example 1 at 700 p.s.i.g., 1 LHSV, and about 970° F. The results are shown in Table II.

TABLE II

| Run No. | Days on stream | Temp., °F. | Hydrogen (s.c.f./bbl. ×10⁻³) | Weight percent product | | | | | |
|---|---|---|---|---|---|---|---|---|---|
| | | | | Benzene | Toluene | Xylenes | Trimethyl-benzenes | n-C₇ | n-C₈ |
| 1 | 1 | 976 | 10.6 | 19.4 | 57.4 | 20.3 | 3.0 | 0.9 | 0.25 |
| 2 | 2 | 976 | 10.8 | 14.3 | 67.7 | 16.3 | 1.9 | 3.2 | 2.1 |
| 3 | 4 | 973 | 14.6 | 6.0 | 85.5 | 8.0 | 0.6 | 4.5 | 3.4 |
| 4 | 5 | 972 | 14.0 | 6.1 | 86.6 | 7.1 | 0.3 | 5.8 | 4.8 |
| 5 | 6 | 970 | 13.8 | 5.4 | 89.3 | 5.3 | 0.2 | 5.9 | 5.1 |
| 6 | 7 | 9 0 | 14.1 | 4.9 | 88.4 | 6.2 | 0.5 | 5.8 | 4.9 |

As Table II shows, the overall activity of the catalyst, as evidenced by the conversion of $C_7$ and $C_8$ hydrocarbons as well as the conversion of toluene, decreased with the passage of time. However, the catalyst was, during its entire life, capable of producing a product of reduced toluene content and enriched benzene and xylene content. Production of trimethylbenzenes was relatively low. While conditions could be adjusted during this procedure for the production of a maximum quantity of ortho and para-xylenes, the xylenes could, of course, be separated, and the meta isomer isomerized in accordance with the present invention to produce the more valuable ortho and para isomers.

It will be understood that the foregoing disclosure relates primarily to certain preferred embodiments of the invention, and that numerous modifications or alterations may be made therein without departing from the spirit and scope of the invention as set forth in the appended claims.

We claim:

1. A method for the isomerization and disproportionation of alkyl aromatic hydrocarbons comprising: contacting alkyl aromatic hydrocarbons at elevated temperatures in the presence of hydrogen with a catalyst comprising a silica-alumina cracking base impregnated with a hydrogenation component, a second metallic component, and a halogen, said hydrogenation component being selected from the group consisting of cobalt, nickel, platinum, rhodium, and palladium, and being present in an amount from about 0.1 percent to about 30 percent based on the weight of said catalyst; said second metallic component selected from the group consisting of arsenic, antimony, bismuth, and phosphorus, and being present in an amount from about 0.1 to about 2.0 gram atoms per gram atom of said hydrogenation component; and said halogen being present in said catalyst before contact with hydrocarbons in an amount from about 0.5% to about 6.0%, based on the weight of said catalyst.

2. A method for the isomerization and disproportionation of alkyl aromatic hydrocarbons comprising: contacting alkyl aromatic hydrocarbons at elevated temperatures in the presence of hydrogen with a catalyst comprising a silica-alumina cracking base impregnated with a hydrogenation component, a second metallic component, and fluorine, said hydrogenation component being selected from the group consisting of cobalt, nickel, platinum, rhodium, and palladium, and being present in an amount from about 0.1 percent to about 30 percent based on the weight of said catalyst; said second metallic component selected from the group consisting of arsenic, antimony, bismuth, and phosphorus, and being present in an amount from about 0.1 to about 2.0 gram atoms per gram atom of said hydrogenation component; and said fluorine being present in an amount from about 0.5% to about 6.0%, based on the weight of said catalyst.

3. The method as defined in claim 2 wherein said hydrogenation component is nickel and said second metal is arsenic.

4. The method as defined in claim 3 wherein said alkyl aromatic hydrocarbons are rich in meta-xylene.

5. A method for the isomerization and disproportionation of alkyl aromatic hydrocarbons comprising: contacting alkyl aromatic hydrocarbons with a catalyst at temperatures of about 500–1500° F., under hydrogen pressure of about 100–2000 p.s.i.g., liquid hourly space velocity of about 0.5 to 20, and hydrogen feed rate of about 1000 to 20,000 standard cubic feet per barrel of feed, said catalyst comprising: a silica-alumina cracking base impregnated with a hydrogenation component, a second metallic component, and fluorine, said hydrogenation component selected from the group consisting of cobalt, nickel, platinum, rhodium, and palladium, and being present in an amount from about 0.5 percent to about 10 percent based on the weight of said catalyst; said second metallic component selected from the group consisting of arsenic, antimony, bismuth, and phosphorus, and being present in an amount of from about 0.1 to about 0.5 gram atom per gram atom of said hydrogenation component; and said fluorine being present in an amount from about 0.5 percent to about 6.0 percent, based on the weight of said catalyst.

6. The method as defined in claim 5 wherein said alkyl aromatic hydrocarbons are rich in meta-xylene.

7. The method as defined in claim 6 wherein said temperature is about 600 to about 900° F.

References Cited

UNITED STATES PATENTS

| 3,377,400 | 4/1968 | Wise | 260—668 |
| 3,417,157 | 12/1968 | Pollitzer | 260—672 |
| 3,437,710 | 4/1969 | Pollitzer | 260—672 |
| 3,442,966 | 5/1969 | Pollitzer | 260—672 |
| 3,206,391 | 9/1965 | Gutberlet et al. | 208—110 |
| 2,752,289 | 6/1956 | Haensel | 208—139 |

FOREIGN PATENTS

| 1,104,409 | 2/1968 | Great Britain | 208—111 |

PAUL M. COUGHLIN, Jr., Primary Examiner

G. E. SCHMITKONS, Assistant Examiner

U.S. Cl. X.R.

208—111; 252—437, 441, 455 R; 260—668A, 671 M, 672 R